Sept. 15, 1964  H. L. BERKEY  3,148,394
THREAD CUTTING CHASER FOR BUTTRESS THREAD CUTTING
Filed Oct. 17, 1960
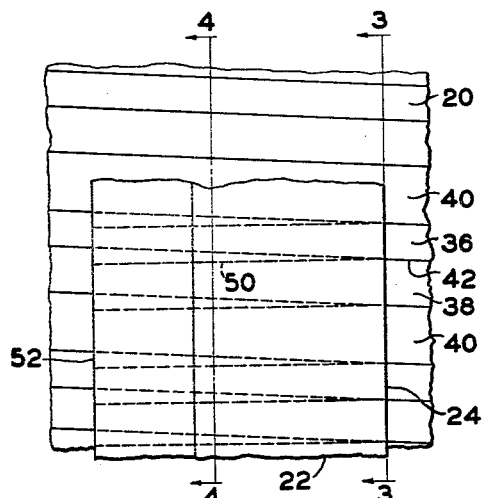
FIG. 2   FIG. 4   FIG. 3
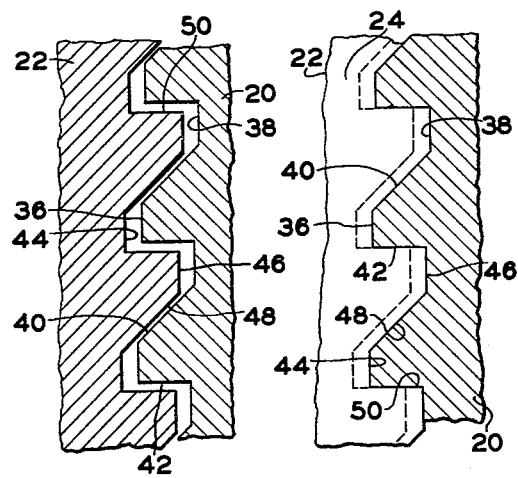
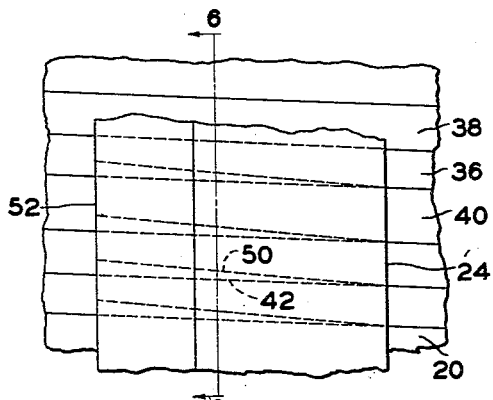
FIG. 5   FIG. 6
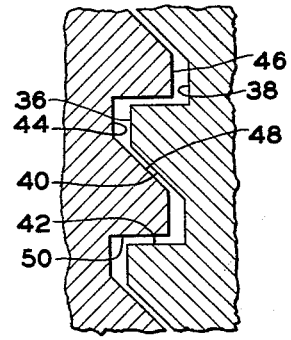
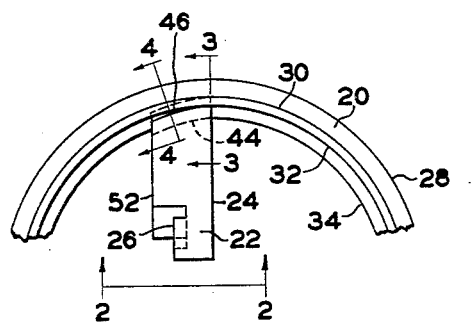
FIG. 1
INVENTOR
HARRY L. BERKEY
BY
ATTORNEYS United States Patent Office 3,148,394
Patented Sept. 15, 1964

3,148,394
THREAD CUTTING CHASER FOR BUTTRESS
THREAD CUTTING
Harry L. Berkey, Waynesboro, Pa., assignor to Landis Machine Company, Waynesboro, Pa., a corporation of Pennsylvania
Filed Oct. 17, 1960, Ser. No. 62,996
6 Claims. (Cl. 10—111)

This invention relates to tools for cutting internal threads and in particular to chasers used in a collapsible tap for cutting a buttress thread profile of which one flank is perpendicular to the axis of the workpiece.

The cutting of threads, particularly internal threads, having elements perpendicular to the axis of the piece, has long presented a formidable problem. The difficulty of manufacture by mass production methods has been responsible in large part for the virtual abandonment of the square thread wherein both flanks of the thread profile are perpendicular to the work axis. The chief difficulty is that of providing the necessary clearance for the cutting edge at the flank of the thread to prevent damage to the cutting tool and the formed thread.

A radial relief along the land of a solid tap or on the chasers of a collapsible tap, a relief gradually increasing as the distance from the cutting edge increases, provides a cutting clearance for the crest and root surfaces of the thread but no amount of radial clearance can result in a clearance at the flanks. Heretofore, the necessary cutting clearance at the flanks of the thread ridges on the tool has been created by hand filing the side faces thereof except at the cutting edge. This procedure is subject to two serious disadvantages. First, it renders the tool extremely expensive to make originally and second, if the tool is re-sharpened, material is ground away from the cutting edge and the new cutting edge is formed on the previously hand filed portion of the ridge. Thus, the thread produced on the work by such a re-sharpened tool differs from that originally produced. Hence, as a practical matter, the initially very expensive tool cannot be re-sharpened and must be discarded the first time it becomes dull.

Various other devices, usually based on the principle of using multiple operations, have been proposed to solve the problem. One example is the tap illustrated and described in United States Patent 1,592,765, issued July 13, 1926. By first roughing out the thread and then finishing with a tool which performs a minimum of work on the flanks of the thread, this patentee professes to form a thread having flanks perpendicular to the axis of the work. At least two disadvantages are present. The necessity of providing two different tools and performing two separate operations doubles the cost of producing the thread. Further, the thread produced is characterized by a very bad finish on the flanks due to the inevitable rubbing of the tool upon the finished flanks which, in turn, is due to the absence of cutting clearance. This condition is aggravated when the principle in question is applied to a collapsible tap, wherein flank rubbing in the radial direction occurs when the tap collapses and the chasers are withdrawn from the work. In such circumstances it is not uncommon for the cutting edges of the chasers to fracture, which, in effect, destroys the chasers.

The particular thread form, often called a "profile" to which the tools of this invention relate is commonly called a buttress profile and has one flank perpendicular to the axis of the threaded part while the other is inclined thereto at a substantial angle, usually 45°. Such threads find extensive use in oil-field tubular goods wherein the flank perpendicular to the axis serves to transmit the axial stress which is chiefly in one direction only. Further, with the loaded flank perpendicular to the axis, no component of the axial load is converted to radial force. Consequently the bursting strength and hence the wall thickness of the coupling can be held to a minimum, a consideration highly desirable in such structures. The production of such a thread with its single perpendicular flank is beset with the same difficulties as enumerated above for square threads, even though the presence of the inclined flank is taken advantage of in solving the tapping problem in accordance with this invention.

In tapping other thread profiles with a collapsible tap employing insertable and removable chasers, it has heretofore been the general practice to form the thread cutting ridges or profiles on each chaser at an inclination with respect to the coincident axes of tap and workpiece. This inclination has been made substantially equal to the lead angle of the thread being produced, so that the thread ridges on the chaser can lie in the thread groove formed in the workpiece, with the usual radial relief of the chaser providing a cutting clearance for all profile elements not perpendicular to the axis. It has now been found to be possible, convenient and economical to provide adequate cutting clearance for the perpendicular flank of a buttress thread by establishing a new relationship between the chaser profiles and the workpiece profiles. This new relationship is such that each entire thread ridge or profile on the chaser is inclined away from the adjacent perpendicular flank of the profile on the workpiece. This unique combination of the relative inclination of the flanks of the profile and the radial relief provides ample space in the work thread groove to permit the formulation of buttress threads of high quality, economically and without risk of damage to the chasers.

A prominent advantage of the invention is that the cost of manufacture of the tool is no more than for manufacturing tools to form threads of the usual type having two inclined flanks. The invention eliminates the expensive procedure of thinning or relieving the individual ridges. Also, such chasers may be resharpened as with any other thread profile inasmuch as the profile in the chaser is uniform throughout its length. Another important advantage resides in the fact that a second operation is not required to form the perpendicular flank, thus further reducing the production costs as compared to prior conventional practice.

Accordingly, it is an object of the invention to provide improved tap chasers for cutting internal buttress threads having one flank perpendicular to the axis of the workpiece.

It is another object to provide such chasers in which the thread profile is uniform in cross-section across the entire thickness of the chaser.

A further object of the invention is to provide chasers for cutting internal buttress threads having one flank perpendicular to the axis, in which chasers the thread ridges are inclined at an angle that differs from the lead angle of the thread to be produced.

A still further object is to provide such chasers having precisely the final thread profile desired so that no subsequent operation is required.

Further objects and advantages will be apparent from the following specification and the accompanying drawings wherein:

FIGURE 1 shows a partial end view of a tapered pipe coupling with one of a set of collapsible tap chasers in cutting position;

FIGURE 2 is an enlarged fragmentary view of the chaser and coupling of FIGURE 1 looking in the direction of the line 2—2;

FIGURE 3 is a longitudinal section along the cutting edge of the chaser, i.e. along line 3—3 of FIGURES 1 and 2;

FIGURE 4 is a longitudinal section through the coupling and chaser along line 4—4 of FIGURES 1 and 2;

FIGURE 5 is a view similar to FIGURE 2 but showing a thread profile axially reversed from that of FIGURES 2–4; and FIGURE 6 is a longitudinal section through the coupling and chaser along line 6—6 of FIGURE 5.

The workpiece 20 shown in FIGURE 1 is a pipe coupling viewed from one end face. A tapered buttress thread is being cut in the interior of the coupling 20 by a set of collapsible tap chasers, one of which, 22, is shown in cutting position. The cutting face 24 of the chaser 22 is disposed in a radial plane parallel to the axis of the coupling. The inner end of the chaser 22 is formed with an inclined tongue and groove structure 26 for engagement in known manner with the plunger of the tap as shown, for example, in United States Patent 2,557,069 granted June 19, 1951.

The outer end of the chaser 22 is formed with a thread profile complimentary to the profile that is desired in the work piece 20. The line 28 indicates the outside diameter of the coupling 20, thel ine 30 indicates the root of the internal tapered thread at the near end thereof, the line 32 indicates the crest of the thread at the near end thereof and the line 34 indicates the crest of the thread at the far end thereof.

FIGURE 3, being a section lying in the plane 24 of the cutting edge, illustrates the coincident profiles of the thread in the coupling 20 and the ridges and grooves on the chaser 22. The thread profile in the coupling 20 consists of the following elements: a crest 36, a root 38, an inclined flank 40 and a flank 42 perpendicular to the axis of the coupling. The corresponding elements on the chaser are: root 44, crest 46, the inclined flank 48 and perpendicular flank 50.

As shown in FIGURE 1, the entire profile on the chaser 22 is relieved radially. That is to say, the crests 46 and roots 44 are formed on a radius that is not concentric with the tap and workpiece and consequently a substantial clearance is evident between these elements and the coupling thread. This clearance, which is zero at the plane 24 of the cutting edge, gradually increases to a maximum at the trailing edge 52 of the chaser. This clearance is termed the radial cutting clearance.

The dotted line in FIGURE 3 indicates the chaser profile as it would appear in a section spaced from the cutting edge 24, for example along line 4—4 of FIGURE 1, provided the chasers were of conventional construction with only a radial cutting clearance. It will be noted that the radial relief results in ample clearance between the work profile crest 36, root 38 and inclined flank 40 and the corresponding elements of the dotted profile. However, it will also be evident that no clearance has been provided for the perpendicular flank cutting edge 50. It is for that reason that such thread profiles have heretofore been avoided entirely or have been produced by much more laborious and time-consuming methods.

FIGURE 2 illustrates a portion of the thread in the coupling workpiece 20 as viewed from the interior thereof, i.e. from the bottom of FIGURE 1. Since a right-hand thread is illustrated, the lines defining the thread elements slope downward to the right. The deviation of this slope from a horizontal line represents the lead angle of the thread. Superimposed upon the coupling 20 is shown a portion of the chaser 22. As indicated, all of the thread elements on the chaser 22 are made to slope counterclockwise from the lead angle of the thread. As a consequence, a cutting clearance is formed between the flank 42 on the work and the flank 50 on the chaser. This clearance is also evident in FIGURE 4. The cross-sectional form of the profile is uniform at all points across the thickness of the chaser, i.e. from the cutting edge 24 to the trailing edge 52. There is no thinning of the thread ridges so that when the cutting edge is moved closer to the edge 52 by re-sharpening, the thread outline at the cutting edge is unchanged.

FIGURES 5 and 6 show a similar thread but with the attitude of the load bearing or perpendicular flank 42 reversed with respect to the end face of the coupling. Since we are still dealing with a right hand thread, the lines defining the thread elements in FIGURE 5 also slope downward to the right. However, in order to obtain the desired clearance between the flanks, the thread elements on the chaser must be inclined clockwise from the lead angle of the thread as shown in FIGURE 5.

In either case the optimum amount of the deviation of the chaser flank 50 from the work flank 42 is determined by experiment, being to some extent dependent upon the cutting characteristics of the workpiece material. Since this amount is substantially equally effective over a comparatively wide range, it has been found possible, in the case of most sizes of the thread shown in FIGURES 2 and 4, to incline the ridges on the chaser at the lead angle of the thread but in the reverse direction. In a typical case if the workpiece thread is right hand with a 2° lead angle, the profile on the chasers preferably will be formed at a 2° opposite inclination. This results in a clearance angle of 4° between corresponding elements on the tool and workpiece and a further saving in tool costs.

It will be evident that all statements made above relative to the cutting of right hand threads will be equally valid for left hand threads. It is only necessary that the perpendicular flank on the chaser be inclined away from the corresponding flank on the work.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tool for cutting an internal thread on a workpiece, said thread having one flank perpendicular to the workpiece axis and an opposite flank inclined with respect to said workpiece axis, a plurality of cutting ridges on said tool, each cutting ridge terminating at one end in a cutting edge having a form complementary to the form of the thread to be formed on said workpiece, said cutting edge having a portion for cutting said perpendicular thread flank and another portion for cutting said inclined thread flank, each cutting ridge being of uniform section from end to end, said cutting ridges being formed eccentrically of said workpiece and having a maximum radius adjacent said cutting edge, and the axes of said ridges being inclined with respect to the lead angle of the thread to be formed on the workpiece and in the same direction as the lead angle to provide a clearance between said ridges and the flanks of the thread formed on said workpiece.

2. The tool according to claim 1 wherein the relative inclination between the axes of said ridges and the lead angle of the workpiece is substantially twice the lead angle of said thread on the workpiece.

3. A tool for cutting an internal thread on the workpiece, said thread having one flank perpendicular to the workpiece axis, an opposite flank inclined with respect to the workpiece axis, said thread having cylindrical crests and roots, a plurality of cutting ridges on said tool, each cutting ridge terminating at one end in a cutting edge having a form complementary to the form of the thread to be formed on said workpiece and having a portion for cutting each of said flanks and said crests and said roots, each ridge being of uniform section from end to end, said ridges being formed eccentrically of said workpiece and having a maximum radius adjacent said cutting edge, the axes of said ridges being inclined with respect to the lead angle of the thread to be formed on the workpiece and in the same direction as the lead angle to provide a clearance between said ridges and the flanks of the thread formed on said workpiece.

4. The tool according to claim 3 wherein the relative inclination between the axes of said ridges and the lead angle of the workpiece is substantially twice the lead angle of said thread on said workpiece.

5. A tool for cutting internal threads on a workpiece, a plurality of ridges on said tool, said ridges being of uniform section from end to end and terminating at one end in a cutting edge having a profile complimentary to the profile of the thread to be cut on said workpiece, said cutting edge profile comprising crest and root portions diverging radially from the corresponding workpiece profile portions, first flank portions substantially perpendicular to the axis of said workpiece and diverging axially from the corresponding workpiece flank portions and second flank portions oblique with respect to the axis of said workpiece converging axially toward said corresponding workpiece flank portions, the radial divergence of said crest portion being so related to the axial convergence of said second flank portions and the corresponding workpiece flank portions as to provide a cutting clearance at said second flank portions.

6. A set of identical thread cutting tools adapted to be uniformly distributed around the circumference of a workpiece to cut a helical thread thereon, said thread having one flank substantially perpendicular to the axis of said workpiece and an opposite flank oblique with respect to said axis, crest and root portions joining said flanks, a plurality of ridges on each of said tools, said ridges being of uniform section from end to end and terminating at one end in a cutting edge having a profile complimentary to the profile of the thread to be cut on said workpiece, all of said cutting edges being disposed in essentially the same relation to a helical path whereby each cutting edge cuts said workpiece on each flank of said thread, and all of said ridges on each of said tools being inclined with respect to said helical path in a direction away from said perpendicular flank to provide cutting clearance at said perpendicular flank and said ridges diverging radially from said oblique flank, crest, and root of said thread to provide cutting clearance at said flanks, crests, and roots.

References Cited in the file of this patent

UNITED STATES PATENTS

| | | |
|---|---|---|
| 1,509,438 | Miller | Sept. 23, 1924 |
| 1,613,224 | Elstone | Jan. 4, 1927 |
| 2,166,369 | Petersen | July 18, 1939 |
| 2,275,097 | Webb | Mar. 3, 1942 |